(12) United States Patent
Sakai et al.

(10) Patent No.: US 8,528,708 B2
(45) Date of Patent: Sep. 10, 2013

(54) AIR DAMPER

(75) Inventors: Takahiro Sakai, Kanagawa (JP);
Tomoyoshi Ohnuki, Kanagawa (JP);
Takao Nagai, Kanagawa (JP)

(73) Assignee: Piolax Inc., Yokohama-Shi, Kanagawa (JP)

( * ) Notice: Subject to any disclaimer, the term of this patent is extended or adjusted under 35 U.S.C. 154(b) by 40 days.

(21) Appl. No.: 12/998,608

(22) PCT Filed: Aug. 26, 2009

(86) PCT No.: PCT/JP2009/004117
§ 371 (c)(1),
(2), (4) Date: May 6, 2011

(87) PCT Pub. No.: WO2010/061500
PCT Pub. Date: Jun. 3, 2010

(65) Prior Publication Data
US 2011/0209954 A1 Sep. 1, 2011

(30) Foreign Application Priority Data

Nov. 28, 2008 (JP) .............................. P. 2008-304783

(51) Int. Cl.
*F16F 9/24* (2006.01)
*F16F 9/02* (2006.01)

(52) U.S. Cl.
USPC ... 188/281; 188/282.1; 188/300; 188/322.14; 188/322.15; 188/322.17; 188/322.18; 188/371; 16/66; 16/84; 16/85; 267/64.11; 267/64.28; 267/71; 267/118; 267/119; 267/123

(58) Field of Classification Search
USPC ....................................... 188/281
IPC ....................... F16F 9/02, 9/32, 9/36
See application file for complete search history.

(56) References Cited

U.S. PATENT DOCUMENTS

| 4,792,128 | A | * | 12/1988 | Holley | 267/118 |
| 5,104,098 | A | * | 4/1992 | Kaneko | 267/64.11 |
| 5,220,706 | A | | 6/1993 | Bivens | |

(Continued)

FOREIGN PATENT DOCUMENTS

| CN | 101074711 A | 11/2007 |
| FR | 2 692 638 A1 | 12/1993 |

(Continued)

OTHER PUBLICATIONS

French Office Action dated Apr. 25, 2012.

(Continued)

*Primary Examiner* — Robert A Siconolfi
*Assistant Examiner* — San Aung
(74) *Attorney, Agent, or Firm* — McGinn IP Law Group, PLLC

(57) ABSTRACT

An air damper is provided which can exhibit an appropriate braking force in accordance with an input load.
There is provided an air damper including: a tubular cylinder 1 in which both end portions are opened; a piston 2 which moves within the cylinder 1; and a cap 3 which closes a one-end opening of the cylinder 1, wherein the cylinder 1 has an annular seal surface 4 formed on a circumferential surface of the one-end opening, wherein the cap is mounted on the one-end opening side of the cylinder 1 so as to be moveable or deformable along an axial direction of the cylinder 1, wherein the cap is brought into contact with or separated from the seal surface 4 in accordance with a pressure change due to a movement of the piston 2 within the cylinder 1, and wherein a first orifice 14 is opened in a base plate 12 of the cap, characterized in that: a second orifice having an inlet area smaller than the first orifice is defined between the cap 3 and the cylinder 1 during an operation of the first orifice 14.

20 Claims, 9 Drawing Sheets

(56) References Cited

U.S. PATENT DOCUMENTS

| | | | | |
|---|---|---|---|---|
| 5,275,387 A | * | 1/1994 | Cotter et al. | 267/64.11 |
| 5,697,477 A | | 12/1997 | Hiramoto et al. | |
| 6,062,352 A | | 5/2000 | Shinozaki et al. | |
| 6,199,838 B1 | * | 3/2001 | Cotter | 267/64.28 |

FOREIGN PATENT DOCUMENTS

| | | | |
|---|---|---|---|
| GB | 2 267 948 A | 12/1993 |
| JP | 2-58137 U | 4/1990 |
| JP | 6-50372 A | 2/1994 |
| JP | 8-105482 A | 4/1996 |
| JP | 2000-065116 A | 3/2000 |
| JP | 2006-283877 A | 10/2006 |

OTHER PUBLICATIONS

Chinese Office Action dated Oct. 10, 2012, with English translation.

* cited by examiner

AIR DAMPER

TECHNICAL FIELD

The present invention relates to a cylinder type air damper which is used for a glove box of an automotive vehicle, for example.

BACKGROUND ART

Although not specifically shown, a this type of a conventional air damper includes a tubular cylinder which are opened at both end portions, a piston which moves within the cylinder, and a cap which closes a one-end opening of the cylinder. In the cylinder, an annular seal surface is formed on an inner circumferential surface side of the one-end opening, and the cap has a disk-like base plate which is mounted in the one-end opening of the cylinder so as to move along an axial direction of the cylinder and an annular seal flange which extends from the base plate so as to project in a radial direction, one orifice being opened in the base plate (for example, refer to Patent Document 1).

Consequently, in the case of this air damper being used in an glove box of an automotive vehicle, the cylinder is fixed rotatably to an instrument panel side, and a distal end portion of a piston rod which projects from the other-end end portion of the cylinder is fixed rotatably to the glove box side. Then, when the glove box is moved towards an opening direction, the piston rod is gradually pulled out of an interior of the cylinder, and the piston moves in the same direction within the cylinder. However, at this point in time, since the base plate of the cap is allowed to move by a change in pressure within the cylinder, whereby the seal flange of the cap comes into close contact with the seal surface of the cylinder in a perfect fashion, it is ensured that the glove box moves slowly to an open state by a flow resistance of air which passes through the one orifice.

In contrast, when the glove box is moved towards a closing direction, since the piston rod is gradually pushed into the cylinder in response to the movement of the glove box, the piston also moves in the same direction within the cylinder. However, at this time, the base plate of the cap moves in a reverse direction through the air within the cylinder by a change in pressure within the cylinder, so as to cause the seal flange to move away from the seal surface of the cylinder to thereby cause the air within the cylinder to escape to the outside. By this, a closing operation of the glove-box is promoted.

Patent Document 1: JP-2000-065116-A

DISCLOSURE OF INVENTION

Problem that the Invention is to Solve

With the conventional air damper, however, since the inlet area of the orifice does not change at all even when the input load changes, there has been caused a fear that there is provided a large difference in opening speed of the glove box between when the air damper is used in a glove box on which a heavy object is loaded and when the air damper is used in a glove box on which a light object is loaded, for example.

Means for Solving the Problem

The invention has been developed with a view to solving effectively the problem inherent in the conventional air damper described above.

An invention of claim 1 provides an air damper including: a tubular cylinder in which both end portions are opened; a piston which moves within the cylinder; and a cap which closes a one-end opening of the cylinder, wherein the cylinder has an annular seal surface formed on a circumferential surface of the one-end opening, wherein the cap is mounted on the one-end opening side of the cylinder so as to be moveable or deformable along an axial direction of the cylinder, wherein the cap is brought into contact with or separated from the seal surface in accordance with a pressure change due to a movement of the piston within the cylinder, and wherein a first orifice is opened in a base plate of the cap, characterized in that: a second orifice having an inlet area smaller than the first orifice is defined between the cap and the cylinder during an operation of the first orifice.

An invention of claim 2, based on claim 1, provides the air damper, characterized in that: an abutment portion which is smaller than a diameter of the seal surface but is larger than a diameter of the first orifice exists between the cap and the cylinder; a groove which is formed on an abutment surface of the abutment portion and which extends in an outside diameter direction of the abutment portion; and a second orifice is defined by the groove.

An invention of claim 3, based on claim 1, provides the air damper, characterized in that: an abutment portion which is smaller than a diameter of the seal surface but is larger than a diameter of the first orifice exists between the cap and the cylinder; fine concave-convex shapes are formed on an abutment surface of the abutment portion; and a second orifice is defined by the fine concave-convex shapes.

An invention of claim 4, based on claim 1, provides the air damper, characterized in that: an abutment portion which is smaller than a diameter of the seal surface but is larger than a diameter of the first orifice exists between the cap and the cylinder; a through hole communicating with an interior of the cylinder is formed in the abutment portion; and a second orifice is defined by the through hole.

An invention of claim 5, based on claim 2 or 3, provides the air damper, characterized in that: the abutment portion has a recess-like space whose diameter is larger than the first orifice.

An invention of claim 6, based on claim 1, provides the air damper, characterized in that: an abutment portion which is smaller than a diameter of the seal surface but is larger than a diameter of the first orifice exists between the cap and the cylinder; the abutment portion has a recess-like space whose diameter is larger than the first orifice; and a through hole is formed in a bottom portion or a side portion of the recess-like space.

An invention of claim 7, based on claim 2, provides the air damper, characterized in that: the groove is formed on the cap side.

An invention of claim 8, based on claim 3, provides the air damper, characterized in that: the fine concave-convex shapes are formed on a cap side.

An invention of claim 9, based on any of claims 1 to 8, provides the air damper, characterized in that: the first orifice is positioned on an axis of the cylinder.

An invention of claim 10, based on claim 2 or 3, provides the air damper, characterized in that: the cap is formed of a soft material.

Advantage of the Invention

Consequently, In the invention of claim 1, since only the first orifice is activated when an input load is low, while when the input load is high, the second orifice is activated so as to increase the braking force, it becomes possible to control the air damper so that a large difference in opening speed of the glove box is not produced by the weight of a loaded object.

In the invention of claim 2, the second orifice can be defined simply by the groove, and in the event that the second orifice is defined by the hole, the mold has a pin-like shape. However, in the event that the mold is made to take the form of a groove, since rib-like projections may only have to be provided on the mold, the diameter of the second orifice can be made as small as possible while ensuring the strength of the mold of the second orifice.

In the invention of claim 3, by the second orifice being defined by the fine concave-convex shapes, the strength of the mold can be increased further than when defined by the hole and the groove.

In the invention of claim 4, defining the second orifice by the through hole makes it difficult for the second orifice to be subjected to the effect of the abutment posture of the cap or the cylinder, and therefore, a stable operation of the second orifice can be ensured.

In the invention of claim 5, air flowing into the recess-like space from the first orifice convects in a spiral fashion within the recess-like space and is made difficult to flow into the second orifice so as to increase flowing resistance, whereby the braking force is increased.

In the invention of claim 6, providing the through hole in the bottom portion or the side portion of the recess-like space also makes it difficult for the through hole to be subjected to the effect of the abutment posture of the cap or the cylinder, and therefore, a stable operation of the second orifice can be ensured. In addition, since the second orifice defined by the second orifice is easily made to communicate with the first orifice via the recess-like space whose diameter is larger than the first orifice, the assembling work is improved. Further, air flowing into the recess-like space from the first orifice convects in the recess-like space in the spiral fashion and is made difficult to flow into the second orifice, whereby since the flowing resistance is increased, the braking force is increased.

In the invention of claim 7, since the groove defining the second orifice is formed on the cap side, a plurality of air dampers having different braking forces can be provided for a common cylinder inexpensively by replacing caps only.

In the invention of claim 8, as the fine concave-convex shapes which define the second orifice are formed on the cap side, a plurality of air dampers having different braking forces can be provided for a common cylinder inexpensively by replacing caps only.

In the invention of claim 9, since the first orifice resides on the axis of the cylinder, a circumferential alignment of the cap is unnecessary when the cap is assembled, facilitating the assembling work.

In the invention of claim 10, since the cap is formed of the soft material, the cap is allowed to bite into the groove or the fine concave-convex shapes, and the groove and the fine concave-convex shapes are allowed to be deformed elastically, thereby making it possible to change the braking force as required.

BEST MODE FOR CARRYING OUT THE INVENTION

The invention is based on an air damper including a tubular cylinder which is opened at both end portions, a piston which moves within the cylinder and a cap which closes a one-end opening of the cylinder, the cylinder having an annular seal surface formed on a circumferential surface of the one-end opening, the cap being mounted on a one-end opening side of the cylinder so as to move or deform along an axial direction of the cylinder to thereby be brought into contact with or separated from the seal surface in accordance with a pressure change due to the movement of the piston within the cylinder, with a first orifice being opened in a base plate of the cap, characterized in that a second orifice having an inlet area smaller than the first orifice is defined between the cap and the cylinder while the first orifice is in operation. By this configuration, when an input load changes, an automatic switching from the first orifice to the second orifice takes place, so as to provide an appropriate braking force.

(First Embodiment)

Figure 1:
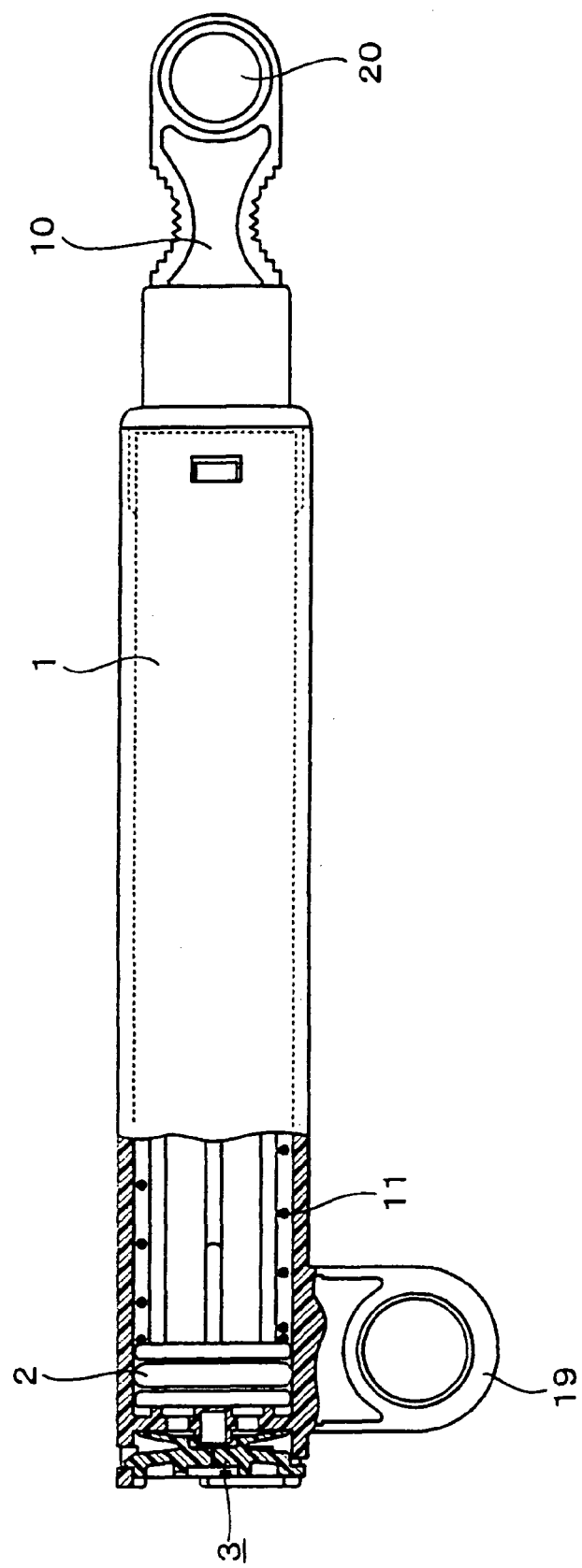
FIG. 1 is front view showing an air damper, which is partially cut away, according to a first embodiment of the invention.

Hereinafter, the invention will be described in detail based on preferred embodiments thereof. As is shown in FIG. 1, an air damper according to a first embodiment includes a tubular cylinder which are opened at both end portions, a piston 2 which moves within the cylinder 1, and a cap 3 which closes a one-end opening of the cylinder 1.

Figure 2:
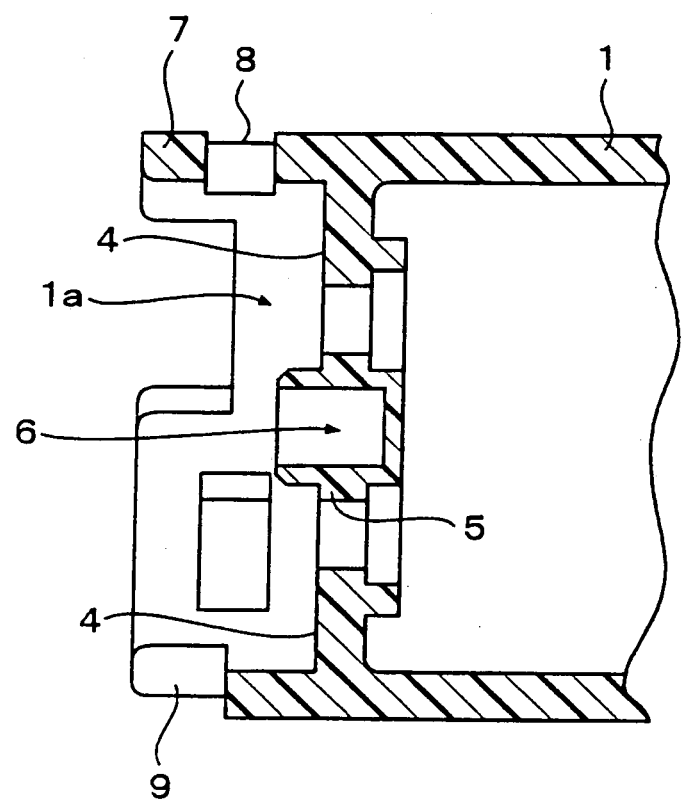
FIG. 2 is a main part sectional view showing a cylinder.

As is also shown in FIG. 2, in the cylinder 1, an annular seal surface 4, which moves into contact with or away from a seal flange 13 of the cap 3, which will be described later, in response to a change in pressure, is formed on an inner circumferential surface side of a one-end opening 1a side thereof. In addition to this, a bottomed abutment tube 5, which projects towards the cap 3 side and has a recess-like space 6 which is opened inwards, is formed at a central portion of a bottom plate which defines the seal surface 4, while an extension wall 7, which extends outwards, is formed continuously on a circumferential edge of the seal surface 4. Pluralities of locking holes 8 and cutout portions 9 are formed in the extension wall 7. Although not shown specifically, a form through which a piston rod 10 can be inserted is given to the other-end opening side of the cylinder 1. Note that the seal surface 4 may be formed on an outer circumferential surface side of the one-end opening 1a.

The piston 2 is molded integrally with the piston rod 10 and is made to be biased elastically towards the one-end opening 1a side of the cylinder 1 by a biasing spring pressure of a compression coil spring 11.

Figure 3A:
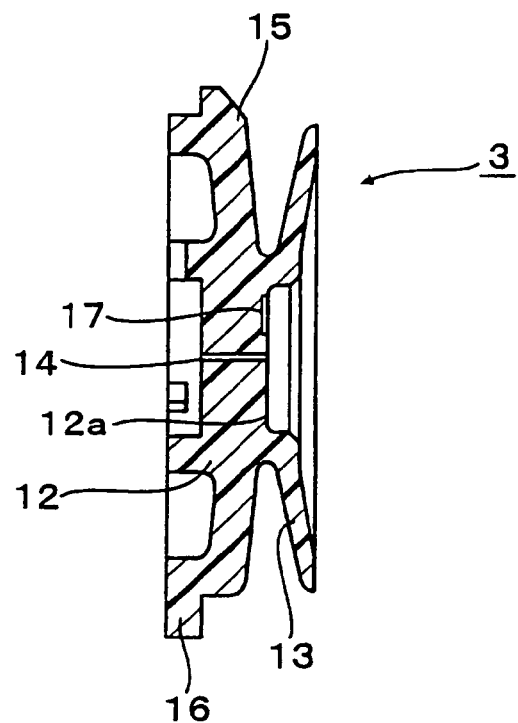
FIG. 3A is a sectional view showing a cap.
Figure 3B:
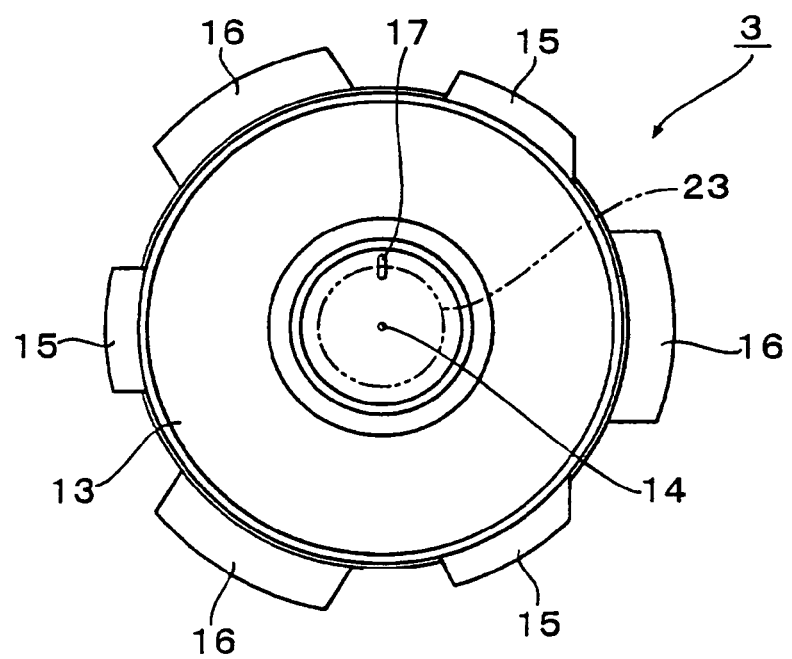
FIG. 3B is a front view showing the same.

The cap 3 is molded integrally from a soft thermoplastic elastomer and has, as is shown in FIGS. 3A and 3B, a disk-like base plate 12 which is attached to the extension wall 7 side so as to move along an axial direction of the cylinder, and an annular seal flange 13 which extends from the disk-like base plate 12 and projects radially. A first orifice 14 is opened in a central portion of the base plate 12 so as to be positioned on an axis of the cylinder 1, while locking pieces 15, which are movably locked in the locking holes 8 and positioning pieces 16 which are locked in the cutout portions 9 are formed on a circumferential surface of the disk-like base plate 12, whereby the seal flange 13 is made to move into contact with or away from the seal surface 4 of the cylinder 1 by a change in pressure in association with the movement of the piston 2 within the cylinder. In this case, a configuration can also be adopted in which the cap 3 is attached to the cylinder 1 so as not to move, so that the seal flange 13 is caused to move into contact with or away from the seal surface 4 of the cylinder 1 by a change in pressure triggered by the movement of the piston 2 within the cylinder 1.

In addition to this, as is shown in the figure, in the cap 3, a base plate surface 12a which faces a distal end portion of the abutment tube 5 of the cylinder 1 is recessed by one step, so that when a high load is inputted into the air damper, the one-step-recessed base plate surface 12a and the distal end portion of the abutment tube 5 are brought into abutment with each other, whereby the abutment portion is caused to appear between the cap 3 and the cylinder 1. On the other hand, a single groove 17 is formed on the one-step-recessed base plate surface 12a so as to extend outwards in an outside diameter direction of the abutment portion. In the abutment state between the one-step-recessed base plate surface 12a and the distal end portion of the abutment tube 5, by making use of the single groove 7 aggressively, a second orifice whose inlet area is smaller than an inlet area of the first orifice 14 can be defined. In addition, in the event that no load or only a low load is inputted into the air damper, the abutment portion is set so that a gap 18 can be formed between the one-step-recessed base plate surface 12a and the distal end portion of the abutment tube 5.

Figure 4:
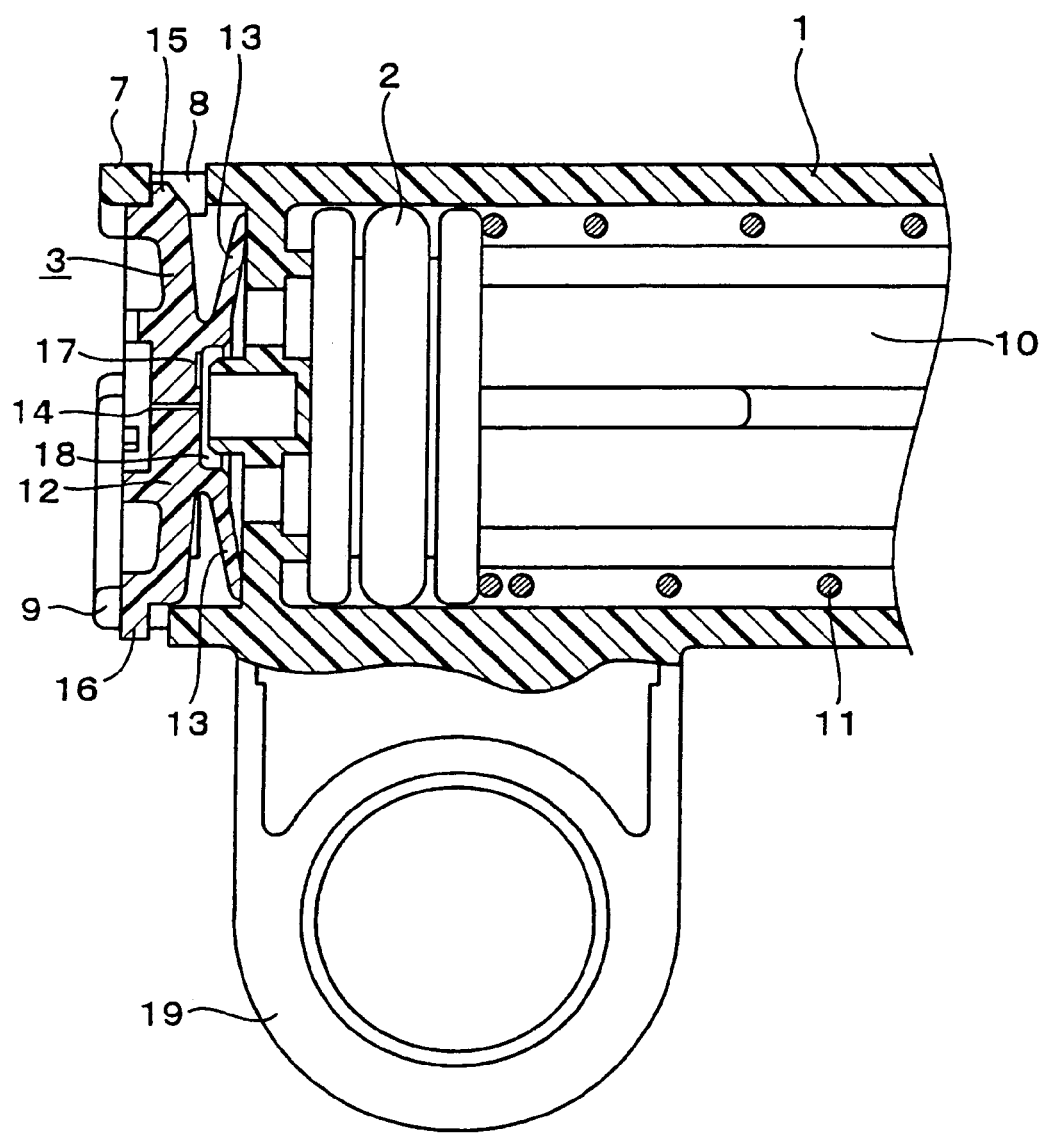
FIG. 4 is a main part sectional view showing a state in which the air damper is assembled.

Thus, when the air damper configured as described heretofore is assembled, the compression coil spring 11, the piston rod 10 and the piston 2 are inserted into an interior of the cylinder 1 from the one-end opening 1a side thereof, and thereafter, the cap 3 is forced into the extension wall 7 with the positioning pieces 16 aligned with the cutout portions 9 formed in the extension wall 7 of the cylinder 1. Then, the locking pieces 15 on the cap 3 are movably locked in the locking holes 8 formed in the extension wall 7, whereby as is shown in FIG. 4, the air damper, which is of a one-way type, can easily be assembled.

Then, when the air damper is actually used in a glove box of an automotive vehicle, although not shown specifically, as with the conventional air damper, with the cylinder 1 rotatably fixed to the instrument panel side via a mounting piece 19, the piston rod 10 may only have to be rotatably fixed to the glove box side via a mounting hole 20 provided at a distal end portion of the piston rod 10.

Figure 5:
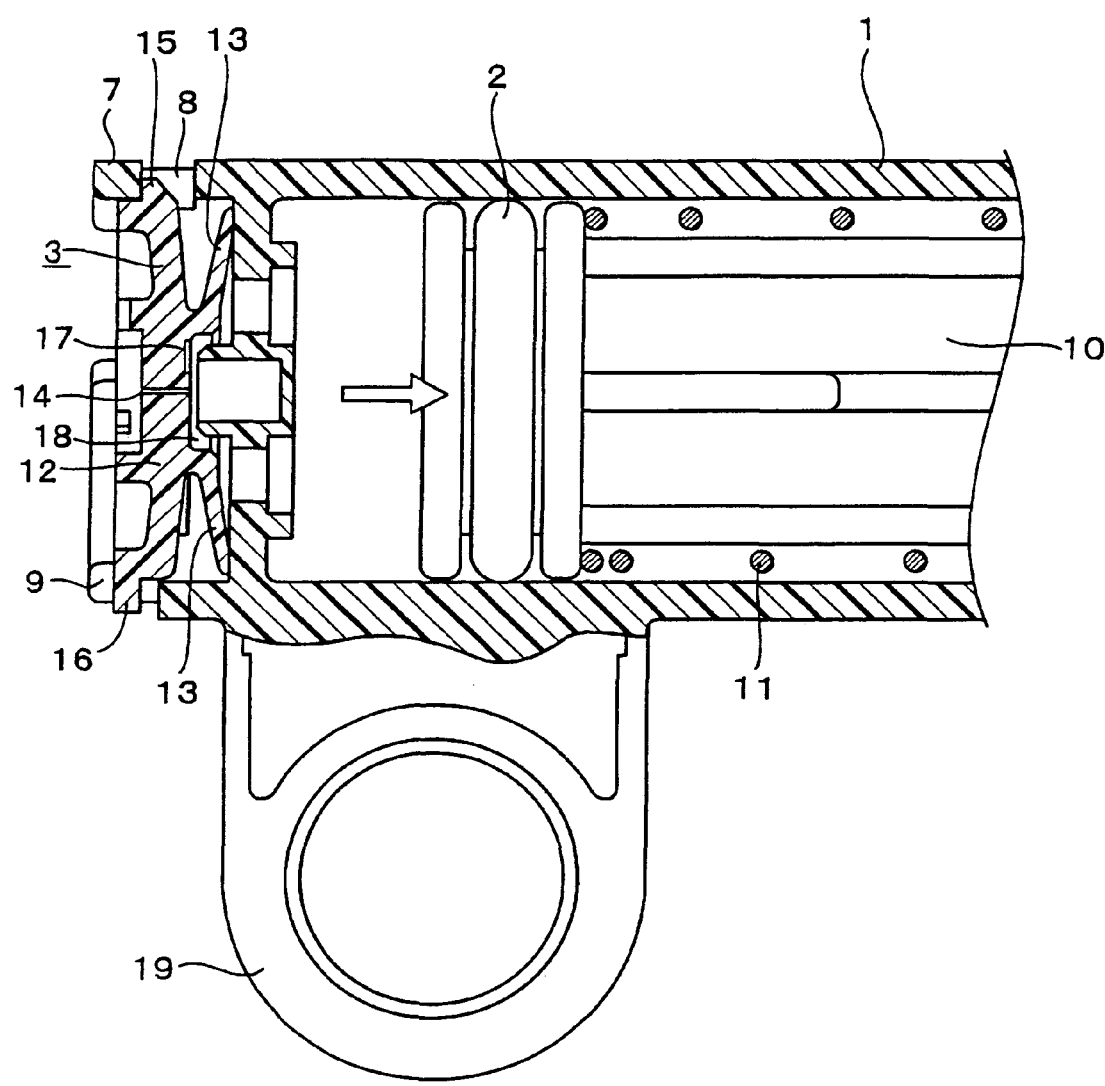
FIG. 5 is a main part sectional view showing a state in which a low load is inputted.

Then, when the glove box is moved towards an opening direction, the piston rod 10 is gradually pulled out of the interior of the cylinder 1. Although the cap 3 also attempts to move so as to be pulled into the interior of the cylinder 1 at the same time as the piston 2 moves in the same direction as the direction in which the piston rod 10 is so pulled out within the interior of the cylinder 1, as this occurs, when a load that is inputted into the air damper is low, the moving speed of the piston 2 also becomes slow, and there occurs no such state that a negative pressure within the cylinder 1 is increased drastically. Therefore, as is shown in FIG. 5, the traveling amount of the cap 3 becomes small, and the seal flange 13 of the cap 3 is closely attached to the seal surface 4 of the cylinder 1 completely like a sucker with the gap 18 secured sufficiently which can be defined between the one-step-recessed base plate surface 12a of the cap 3 and the distal end portion of the abutment tube 5. This ensures that the glove box moves slowly towards the opening direction by flow resistance of air that passes through the first orifice 14 only that is opened in the base plate 12 of the cap 3.

Figure 6:
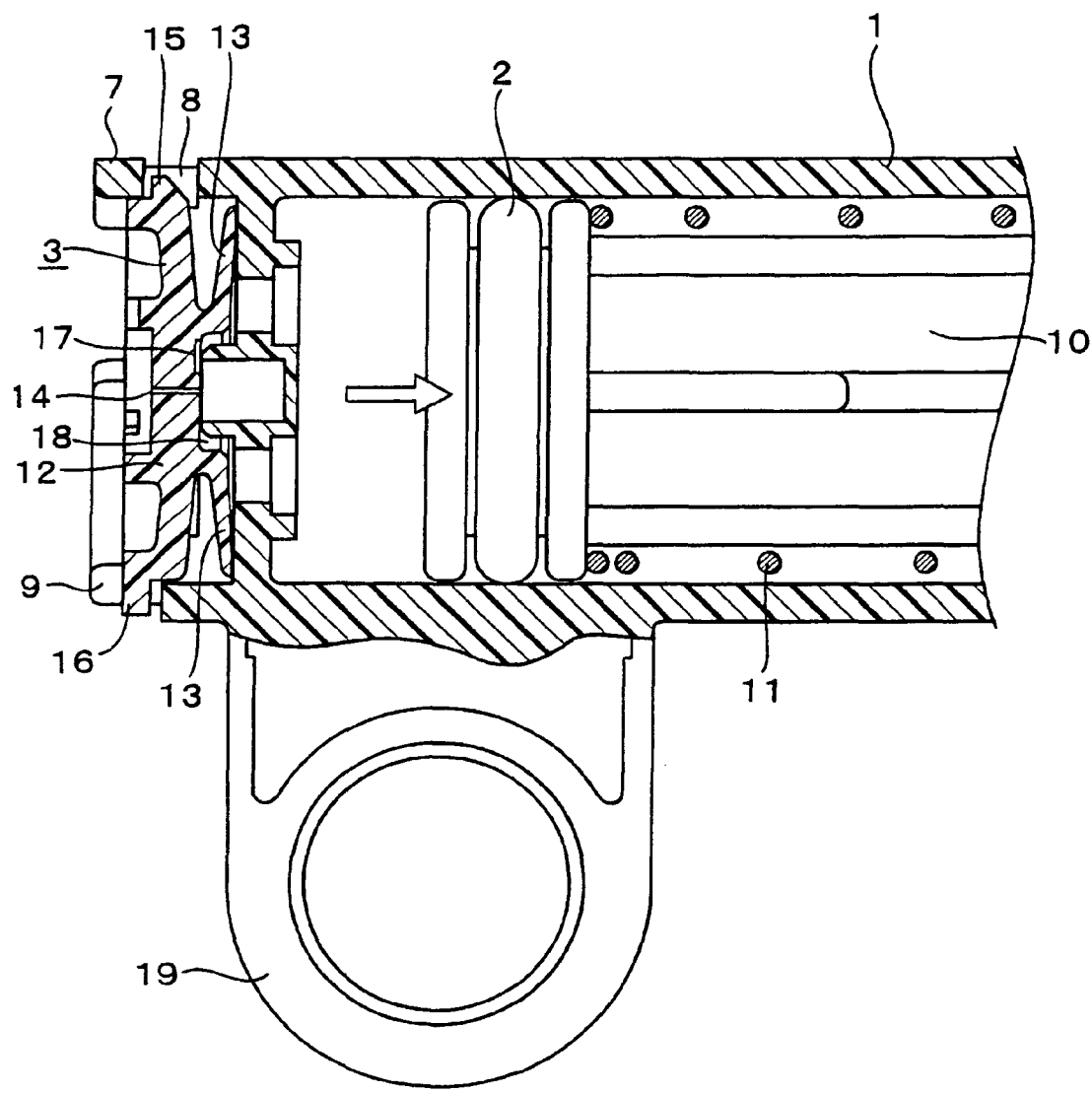
FIG. 6 is a main part sectional view showing a state in which a high load is inputted.

However, when a load that is inputted into the air damper is high as when a heavy object is loaded on the glove box, a negative pressure within the cylinder 1 is increased quickly, and the cap 3 moves greatly within the cylinder 1 as is shown in FIG. 6, whereby the one-step-recessed base plate surface 12a and the distal end portion of the abutment tube 5 is brought into complete abutment with each other. Because of this, this time, since the second orifice whose inlet area is smaller than that of the first orifice 14 is defined by the groove 17, the orifices are automatically switched from the first to the second orifice, as a result of which the opening speed of the glove box can be controlled as required by flow resistance of air that passes through the second orifice. In addition, the existence of the abutment tube 5 while such an automatic switching is occurring functions as a stopper, thereby making it possible to prevent effectively the fall of the cap 3 into the interior of the cylinder 1.

Moreover, air that has flowed in from the first orifice is once introduced into the recess-like space 6 whose diameter is larger than the first orifice 14 of the abutment tube 5 of the cylinder 1 so as to convect in a spiral fashion. Therefore, the air so introduced is made difficult to flow into the second orifice side, which increases the flow resistance, whereby the braking force is also increased. The formation of the groove 17 in the cap 3 advantageously enables an inexpensive provision of a plurality of air dampers having different braking forces for use in a common cylinder 1 only with caps 3 replaced. In addition, since the first orifice 14 is positioned on the axis of the cylinder 1, a circumferential alignment of the cap 3 when it is assembled is made unnecessary, whereby the assembling work is advantageously facilitated. Further, on the contrary, in the event that the groove 17 is formed in the abutment portion on the cylinder 1 side, since the cap 3 is formed from the soft thermoplastic elastomer, the soft cap 3 bites into the groove, whereby the braking force can be changed as required.

In the first embodiment, since in the event that the second orifice is defined by the hole, the mold for forming the hole becomes something like a pin from the fact that the configuration is adopted in which the second orifice is defined by the groove 17, and therefore, in case the pin-like mold is too thin, the mold becomes easy to be broken. However, in the event that the configuration still holds in which the second orifice is defined by the groove 17, rib-like projections may only have to be provided on the mold. Therefore, not only can the groove 17 be molded easily, but also the diameter of the second orifice can be made as small as possible while ensuring the strength of the mold.

Figure 7:
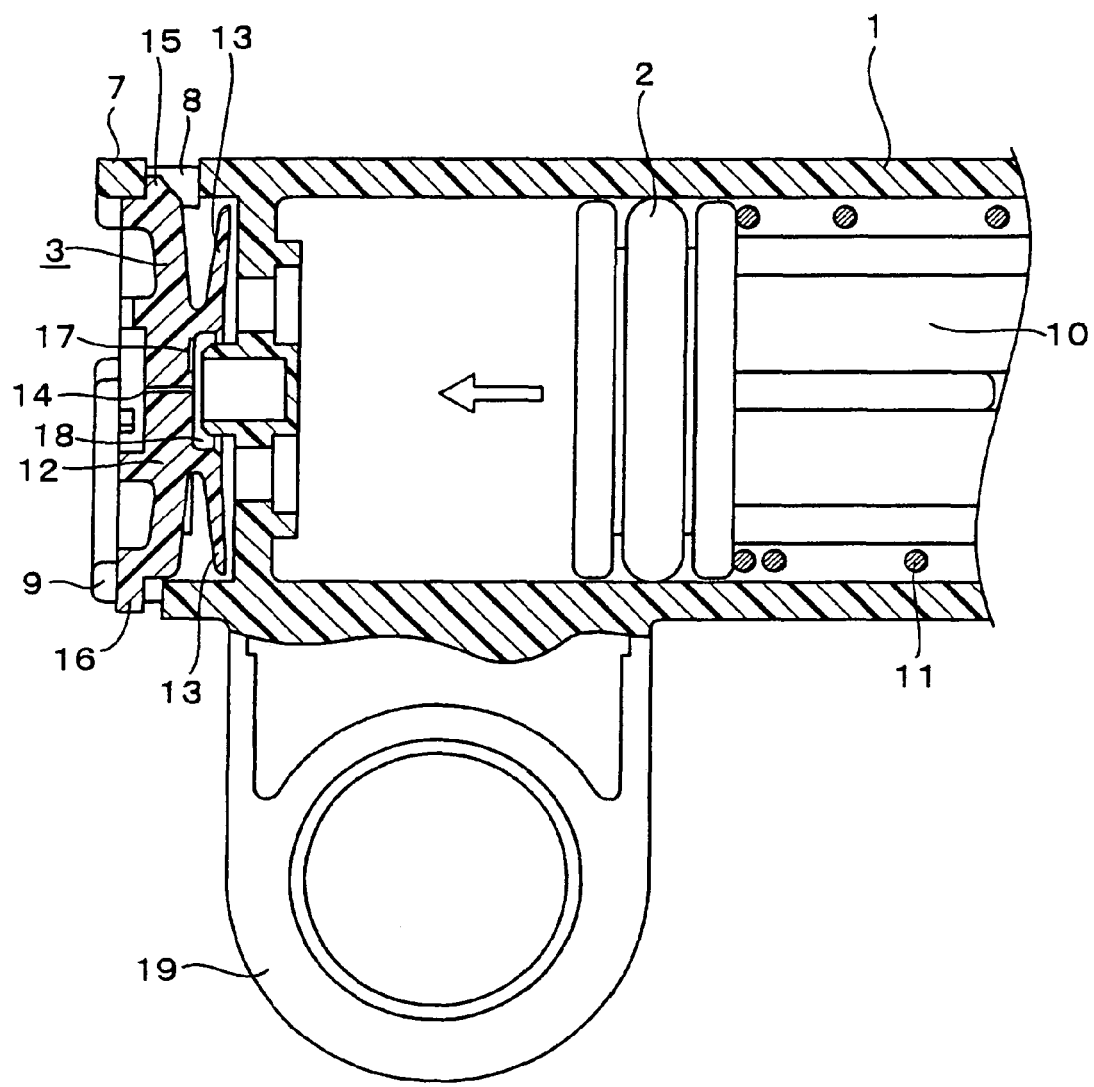
FIG. 7 is a main part sectional view showing a state in which air within the cylinder is allowed to escape to the outside.

In contrast, when the glove box is moved in a closing direction, the piston rod 10 is gradually pushed into the cylinder in response to the movement of the glove box. Therefore, although the piston 2 also moves in the same direction within the cylinder 1, this time, as is shown in FIG. 7, the seal flange 13 of the cap 3 is caused to move away from the seal surface 4 of the cylinder 1 by air accumulated within the cylinder as a result of a change in pressure within the cylinder 1, so that air accumulated within the cylinder 1 is caused to escape to the outside. Therefore, the piston 2 is allowed to return to its original position without any resistance, whereby the closing operation of the glove box is promoted.

In the first embodiment, although the second orifice is made up of the combination of the groove 17 and the recess-like space 6, the second orifice may be defined without providing the recess-like space 6. In this case, the groove 17 needs to communicate directly with the first orifice 14 so as to be extended to an outside diameter side of the abutment portion. Therefore, the groove 17 is preferably formed on the cap 3 side rather than on the cylinder 1 side because the control of assembling accuracy becomes unnecessary.

(Second Embodiment)

Figure 8:
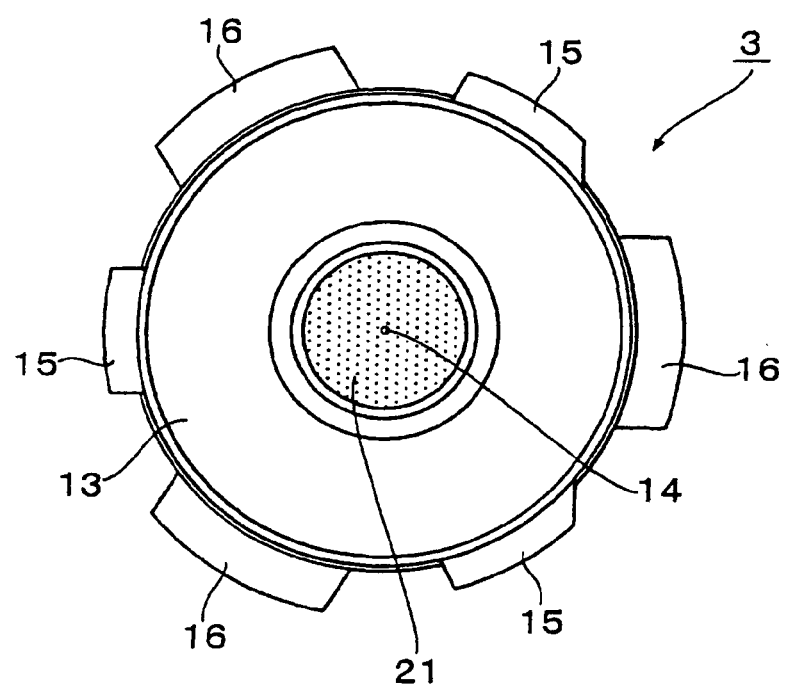
FIG. 8 is a front view showing a cap provided on an air damper of a second embodiment.

Next, an air damper according to a second embodiment will be described. The air damper according to the second embodiment is like to that of the first embodiment with respect to its basic features and adopts the configuration of the first embodiment as it is. However, what the air damper of the second embodiment differs from that of the first embodiment resides in a configuration as is shown in FIG. 8 in which fine concave-convex shapes 21 are formed continuously over the whole of an one-step-recessed base plate surface 12a of a cap 3 so that in such a state that the one-step-recessed base plate surface 12a of the cap 3 is in abutment with a distal end portion of an abutment tube 5, a second orifice can be defined by the fine concave-convex shapes 21 in place of the groove 17 of the first embodiment. Needless to say, the inlet area of the second orifice which is defined by the fine concave-convex shapes 21 is smaller than that of a first orifice 14.

Consequently, also with the second embodiment, when a load that is inputted into the air damper is low, the traveling amount of the cap 3 also becomes small, whereby in such a state that a gap 18 that is defined between the one-step-recessed base plate surface 12a of the cap 3 and a distal end portion of the abutment tube 5 is secured sufficiently, a seal flange 13 of the cap is closely attached to a seal surface 4 of a cylinder 1 in a complete fashion, whereby it is ensured that a glove box moves slowly in an opening direction.

When the load that is inputted into the air damper is high as when a heavy object is loaded on the glove box, the cap 3 moves greatly within the cylinder 1, which brings the one-step-recessed base plate surface 12a into abutment with the distal end portion of the abutment tube 5 in a complete fashion, whereby the second orifice whose inlet area is smaller than that of the first orifice 14 is defined by the fine concave-convex shapes 21 this time. Then, this automatically switches the orifices from the first to the second orifice, as a result of which the opening speed of the glove box can be controlled as required by flow resistance of air that passes through the second orifice in this case, too.

Moreover, also with the second embodiment, similarly to the first embodiment, air that has flowed in from the first orifice 14 is once introduced into a recess-like space 6 of the abutment tube 5 of the cylinder 1 to convect in a spiral fashion, whereby the air is made difficult to flow into the second orifice side, which increases the flow resistance and improves the braking force. In addition, the formation of the fine concave-convex shapes 21 on the cap 3 enables an inexpensive provision of a plurality of air dampers having different braking forces for one common cylinder 1 with replacement of caps 3. Further, in contrast, when the fine concave-convex shapes 21 are formed on the abutment portion on the cylinder 1 side, since the cap 3 is formed from a soft thermoplastic elastomer, the soft cap 3 can bite into the fine concave-convex shapes 21, thereby making it possible to change the braking force as required.

Furthermore, with the second embodiment, since the configuration is adopted in which the second orifice is defined by the fine concave-convex shapes 21, compared with the second orifice which is defined by the hole or the groove 17, the fine concave-convex shapes 21 can be molded more easily, and the diameter of the second orifice can be made as small as possible while ensuring the strength of the mold.

(Third Embodiment)

Figure 9:
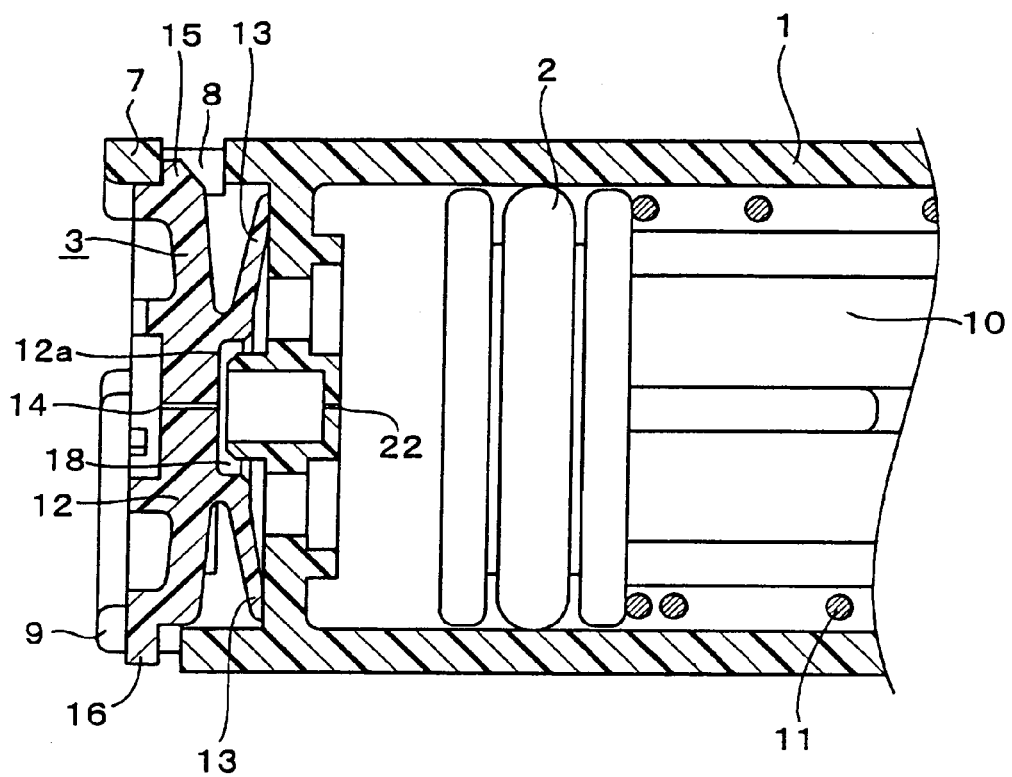
FIG. 9 is a main part sectional view showing an air damper according to a third embodiment.

Finally, an air damper according to a third embodiment will be described. While the means which defines the second orifice is formed on the cap 3 side in the air dampers of the first and second embodiments, in this third embodiment, as is shown in FIG. 9, a through hole 22, which communicates with an interior of a cylinder 1, is formed in a bottom portion or a side portion of an abutment tube 5, so that a second orifice can be defined by this through hole 22, in place of the groove 17 in the first embodiment and the fine concave-convex shapes in the second embodiment, in such a state that an one-step-recessed base plate surface 12a of a cap 3 and a distal end portion of the abutment tube 5 are brought into abutment with each other. Needless to say, an inlet area of the second orifice which is defined by the through hole 22 is also smaller than that of a first orifice 14.

Consequently, also with the third embodiment, when a load that is inputted into the air damper is low, the traveling amount of the cap 3 also becomes small, whereby in such a state that a gap 18 that is defined between the one-step-recessed base plate surface 12a and a distal end portion of the abutment tube 5 is secured sufficiently, a seal flange 13 of the cap is closely attached to a seal surface-4 of a cylinder 1 in a complete fashion, whereby it is ensured that a glove box moves slowly in an opening direction.

When the load that is inputted into the air damper is high as when a heavy object is loaded on the glove box, the cap 3 moves greatly within the cylinder 1, which brings the one-step-recessed base plate surface 12a thereof into abutment with the distal end portion of the abutment tube 5 in a complete fashion, whereby the second orifice whose inlet area is smaller than that of the first orifice 14 is defined by the through hol2 22 this time. Then, this automatically switches the orifices from the first to the second orifice, as a result of which the opening speed of the glove box can be controlled as required by flow resistance of air that passes through the second orifice in this case, too.

Moreover, also with the third embodiment, similarly to the first embodiment, air that has flowed in from the first orifice 14 is once introduced into a recess-like space 6 of the abutment tube 5 of the cylinder 1 to convect in a spiral fashion, whereby the air is made difficult to flow into the second orifice side, which increases the flow resistance and improves the braking force. In addition, in this third embodiment, since the through hole 22 is formed not on the cap 3 side but in the bottom portion or the side portion of the abutment tube 5, the second orifice is made difficult to be subjected to the effects of the postures of the cap 3 and the cylinder 1 which are in abutment with each other, thereby making it possible to ensure a stable operation.

Industrial Applicability

Since the air damper according to the invention can change the braking force in accordance with a change in input load so as to exhibit appropriately a braking force matching a high load that is inputted into the air damper even when the high load is so inputted, in the event that the air damper is applied to a glove box of an automotive vehicle or the like, a preferred result'will be obtained.

Description of Reference Numerals
1 cylinder
1a one-end opening
2 piston
3 cap
4 seal surface
5 abutment tube
6 recess-like space
7 extension wall
8 locking hole.
9 cutout
10 piston rod
11 compression coil spring
12 base plate
12a one-step-recessed base plate surface
13 seal flange
14 first orifice
15 locking piece
16 positioning piece
17 groove
18 gap
19 mounting piece
20 mounting hole
21 fine concave-convex shape
22 through hole
23 outside diameter of abutment portion

The invention claimed is:

1. An air damper comprising:
a tubular cylinder in which both end portions are opened;
a piston which moves within the cylinder; and
a cap which closes a one-end opening of the cylinder,
wherein the cylinder has an annular seal surface formed on a circumferential surface of the one-end opening,
wherein the cap is mounted on the one-end opening side of the cylinder so as to be moveable or deformable along an axial direction of the cylinder,
wherein the cap is brought into contact with or separated from the seal surface in accordance with a pressure change due to a movement of the piston within the cylinder,
wherein a first orifice is opened in a base plate of the cap,
wherein an abutment portion which is smaller than a diameter of the seal surface but is larger than a diameter of the first orifice exists between the cap and the cylinder, and
wherein a second orifice having an inlet area smaller than the first orifice is defined between the cap and the cylinder when the cap is brought into contact with the cylinder at the abutment portion during an operation of the first orifice.

2. The air damper of claim 1,
wherein a groove which is formed on an abutment surface of the abutment portion and which extends in an outside diameter direction of the abutment portion, and
wherein the second orifice is defined by the groove.

3. The air damper of claim 1,
wherein fine concave-convex shapes are formed on an abutment surface of the abutment portion, and
wherein the second orifice is defined by the fine concave-convex shapes.

4. The air damper of claim 1,
wherein a through hole communicating with an interior of the cylinder is formed in the abutment portion, and
wherein the second orifice is defined by the through hole.

5. The air damper of claim 2,
wherein the abutment portion has a recess-like space whose diameter is larger than the first orifice.

6. The air damper of claim 1,
wherein the abutment portion has a recess-like space whose diameter is larger than the first orifice, and
wherein a through hole is formed in a bottom portion or a side portion of the recess-like space.

7. The air damper of claim 2,
wherein the groove is formed on a cap side.

8. The air damper of claim 3,
wherein the fine concave-convex shapes are formed on a cap side.

9. The air damper of claim 1,
wherein the first orifice is positioned on an axis of the cylinder.

10. The air damper of claim 2,
wherein the cap comprises a soft material.

11. The air damper of claim 3, wherein the abutment portion has a recess-like space whose diameter is larger than the first orifice.

12. The air damper of claim 3, wherein the cap comprises a soft material.

13. The air damper of claim 1, wherein the abutment portion comprises a portion of the cylinder and a portion of the cap.

14. The air damper of claim 1, wherein a groove is formed on the cap, and
wherein the second orifice is defined by the groove.

15. The air damper of claim 1, wherein the second orifice is configured so as to be in series with the first orifice when the cap is brought into contact with the cylinder at the abutment portion during the operation of the first orifice.

16. The air damper of claim 2, wherein a portion of the groove is disposed radially outward of the abutment portion.

17. The air damper of claim 1, wherein the abutment portion includes an abutment tube at the one-end opening side of the cylinder so as to contact the base plate of the cap radially outward of the first orifice.

18. The air damper of claim 1, wherein the cap comprises locking pieces which attach to locking holes of the cylinder.

19. The air damper of claim 1, wherein the cap is mounted on the one-end opening side of the cylinder so as to be deformable along the axial direction of the cylinder.

20. An air damper comprising:
a tubular cylinder in which both end portions are opened;
a piston which moves within the cylinder; and
a cap which closes a one-end opening of the cylinder,
wherein the cylinder has an annular seal surface formed on a circumferential surface of the one-end opening,
wherein the cap is mounted on the one-end opening side of the cylinder so as to be moveable or deformable along an axial direction of the cylinder,
wherein the cap is brought into contact with or separated from the seal surface in accordance with a pressure change due to a movement of the piston within the cylinder,
wherein a first orifice is opened in a base plate of the cap, and
wherein a second orifice having an inlet area smaller than the first orifice is defined between the cap and the cylinder during an operation of the first orifice, the second orifice being provided separately from the first orifice.

* * * * *